US007421763B2

(12) United States Patent
Cheng

(10) Patent No.: US 7,421,763 B2
(45) Date of Patent: Sep. 9, 2008

(54) ADJUSTER FOR FACEMASK

(75) Inventor: Yung-Chu Cheng, Taipei (TW)

(73) Assignee: Center Healthcare Technology Co., Ltd., Taipei (TW)

(*) Notice: Subject to any disclaimer, the term of this patent is extended or adjusted under 35 U.S.C. 154(b) by 148 days.

(21) Appl. No.: 11/222,076

(22) Filed: Sep. 8, 2005

(65) Prior Publication Data

US 2007/0061947 A1 Mar. 22, 2007

(51) Int. Cl.
*F16G 11/03* (2006.01)

(52) U.S. Cl. ................................ 24/129 R; 128/207.11

(58) Field of Classification Search ............ 128/207.11, 128/206.13, 207.17, 204.11; 24/712.7, 18, 24/115 R, 129 R, 130, 129 B, 129 D, 129 A; 2/424
See application file for complete search history.

(56) References Cited

U.S. PATENT DOCUMENTS 1,251,470 A * 1/1918 Bright ......................... 24/130
3,296,699 A * 1/1967 Elder, Jr. ................... 24/712.6
4,185,636 A * 1/1980 Gabbay et al. .............. 606/148
4,648,159 A * 3/1987 Dougherty ................. 24/712.7
6,401,309 B1 * 6/2002 Yang ........................... 24/130
2006/0130290 A1 * 6/2006 Yi ............................ 24/129 B

* cited by examiner

*Primary Examiner*—James R Brittain

(57) ABSTRACT

An adjuster for facemask includes a main body and a plurality of fixing pillars. Each of the fixing pillars provides an anti-move-back elastic member and a fixing groove in a way of the anti-move-back elastic member and a fixing groove in a way of the anti-move-back elastic member being received in the fixing groove. An end of a girding band on the facemask is capable of being inserted into the fixing groove to be adjustably held by the anti-move-back elastic member tightly such that the facemask can be worn comfortably and contact the face area surrounding the mouth and the nose of the user tightly.

1 Claim, 6 Drawing Sheets

ADJUSTER FOR FACEMASK

BACKGROUND OF THE INVENTION

1. Field of the Invention

The present invention is related to an adjuster for a facemask and, more particularly, is related to a device that is available for the user to adjust tightness of the facemask easily and comfortably.

2. Description of the Prior Art

FIG. 1 shows the conventional facemask for protecting the wearer from being infected with viruses. The facemask 1 provides a mask-body 10 and a holding band 11 extending from both lateral sides of the mask-body 10 respectively for being hung to the ears. However, there are only several sizes of the facemask available for different users so that the conventional facemask doesn't fit for everyone. Moreover, the conventional facemask is incapable of covering the mouth closely due to the holding bands 11 inclining upward to hang to the ears. Furthermore, the user usually feels uncomfortable after the conventional facemask is work a period of time. N95 is another type of the conventional facemask and the holding bands of N95 hold the head additionally to allow the facemask to closely contact with the area surrounding the mouth. But, the user feels more uncomfortable when the holding bands press the head.

SUMMARY OF THE INVENTION

The main objective of the present invention is to provide an adjuster for a facemask with which the facemask is capable of closely contacting with the area surrounding the mouth of the user, and being worn easily and comfortably.

Another object of the present invention is to provide an adjuster for a facemask with which the girding band of the facemask can be adjusted the tightness by the user preferably.

A further objective of the present invention is to provide an adjuster for a facemask with which the facemask can be provided with a simple structure and made easily.

A further objective of the present invention is to provide an adjuster for a facemask with which the pressing force exerted with the girding band to the head of the user can be reduced significantly.

Accordingly, an adjuster for a facemask according to the present invention comprises a main body and a plurality of fixing pillars. Each of the fixing pillars further comprises an anti-move-back elastic member and a fixing groove. The anti-move-back elastic member is received in the fixing groove. Hence, the free end of the respective girding band, which is attached to the facemask, is capable of passing through the fixing groove and adjustably held by the anti-move-back elastic member tightly such that the facemask can be worn comfortably and be capable of closely contacting with the face area surrounding the mouth of the user.

DESCRIPTION OF THE PREFERRED EMBODIMENT

Figure 1:
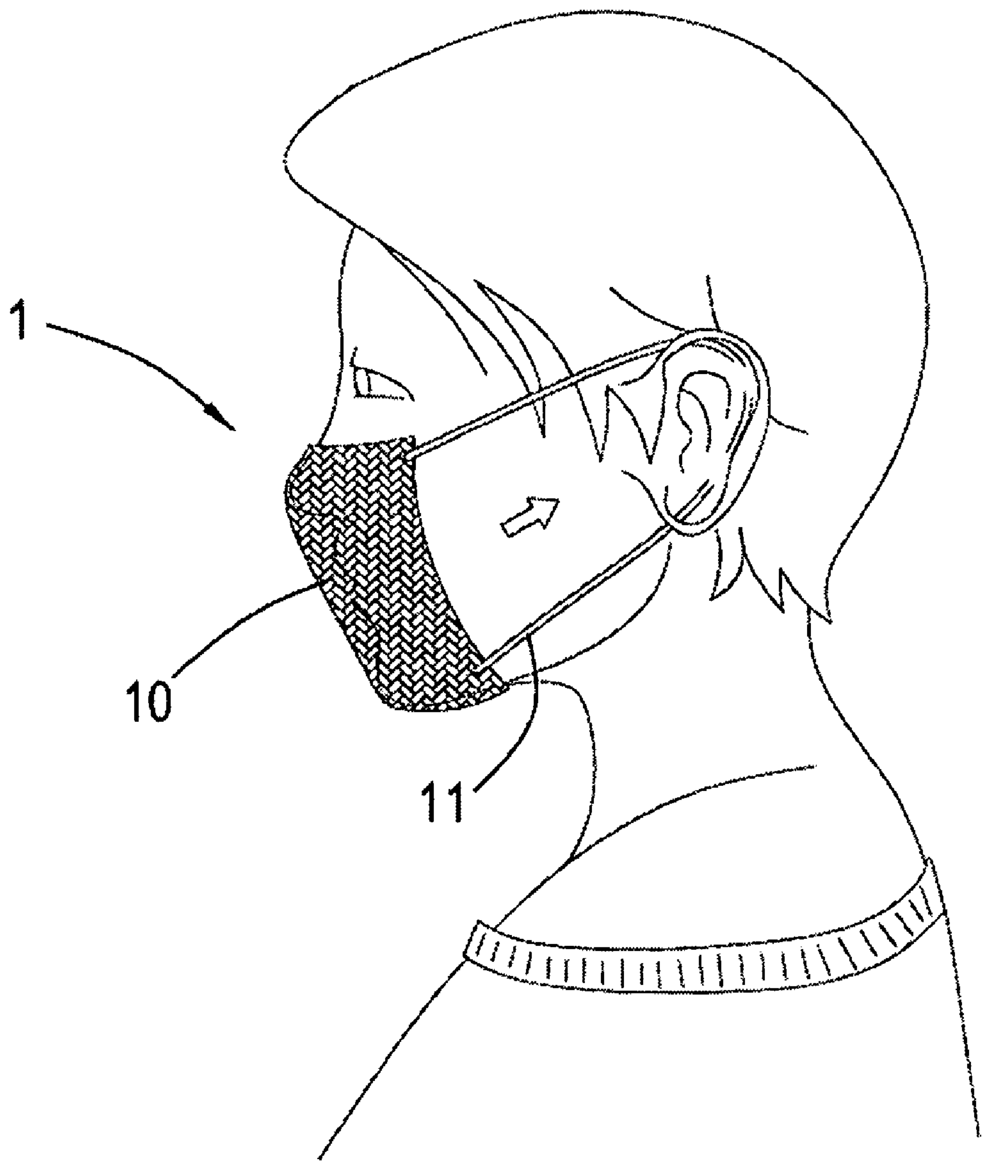
FIG. 1 (Prior Art)
FIG. 1 is a side view of the user wearing the conventional facemask.
Figure 2:
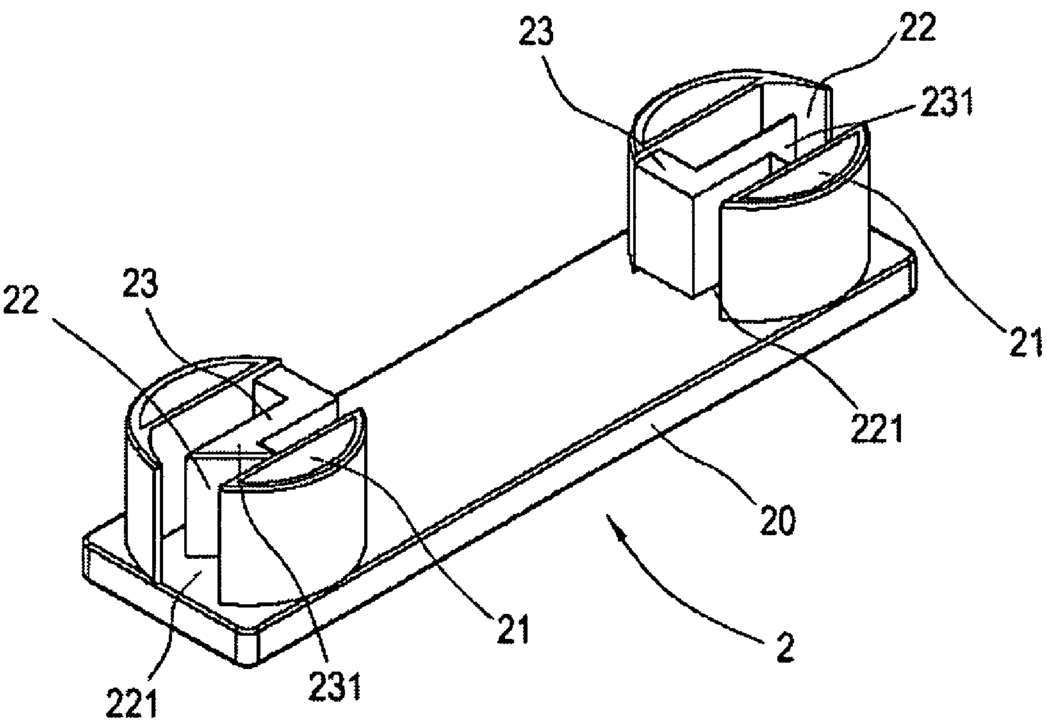
FIG. 2 is a perspective view of an adjuster for a facemask according to the present invention.

Referring to FIG. 2, an adjuster for a facemask in accordance with the present invention is illustrated. The adjuster 2 comprises an elongated plate-shaped main body 20 and two opposite fixing pillars 21 at two ends of the main body 20. Each of the fixing pillars 21 has a circular periphery. A fixing groove 22 crosses the respective fixing pillar 21 to separate the respective fixing pillar 21 into two sector parts with two opposite wall surfaces. An elastic L-shaped anti-move-back elastic member 23 is installed in the fixing groove 22. The long side of the anti-move-back elastic member 23 is parallel to the wall surfaces with an arrow end 231 heading toward an outer opening of the fixing groove 22 and being disposed to contact laterally with one of the wall surfaces. The short side of the anti-move-back elastic member 23 is disposed beside another one of the wall surfaces.

Figure 3:
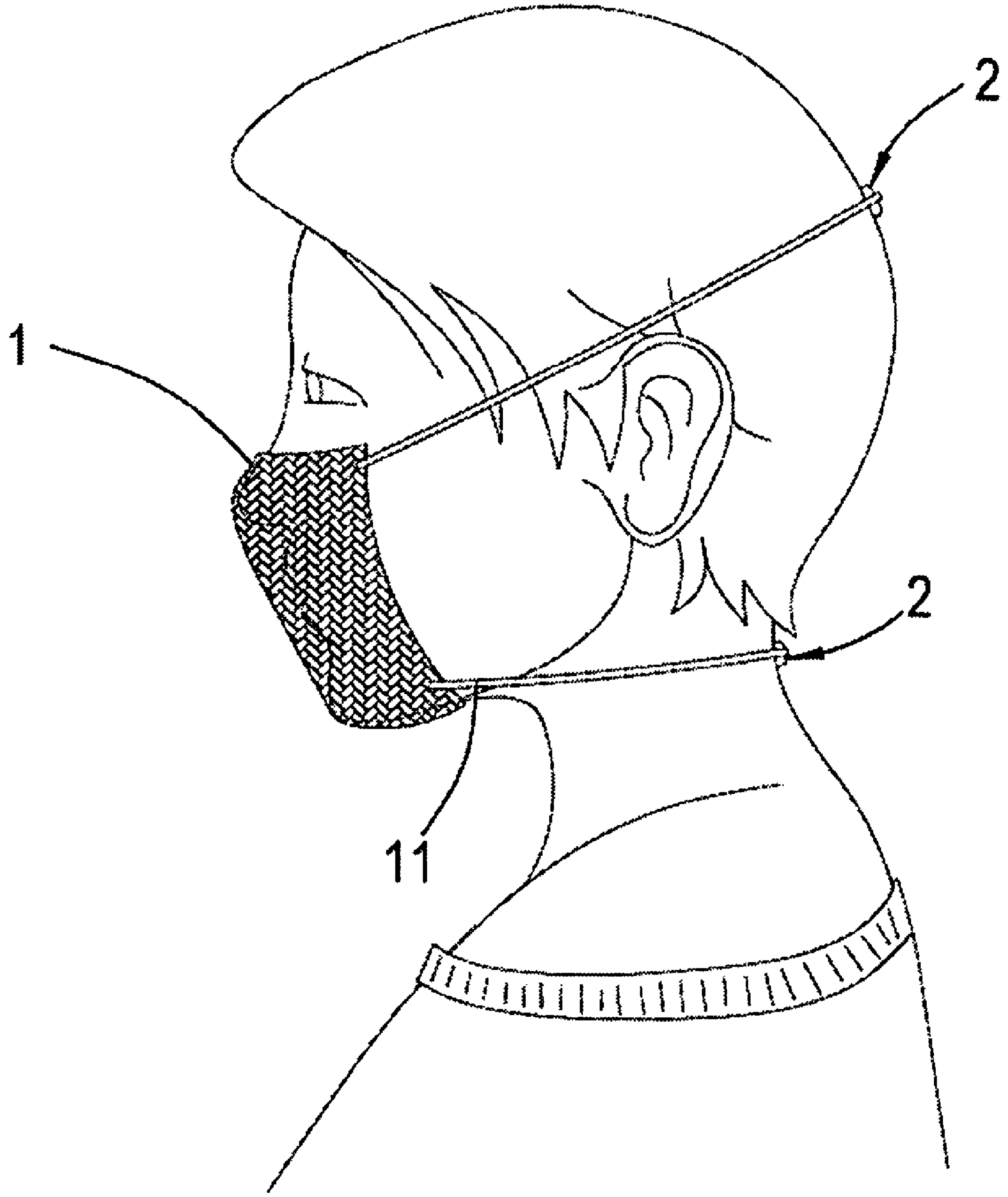
FIG. 3 is a side view of the user wearing the facemask with an adjuster for a facemask according to the invention.
Figure 4:
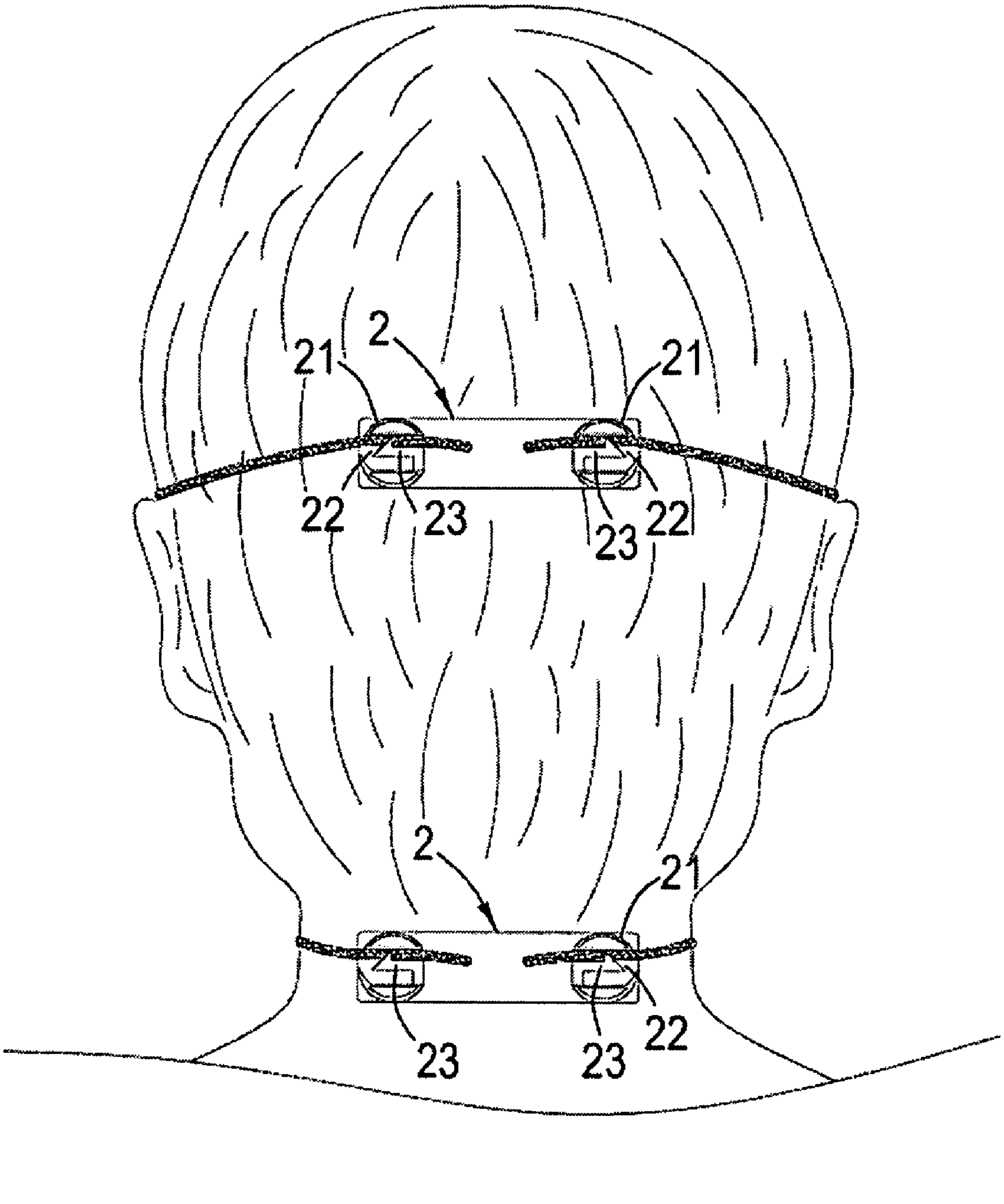
FIG. 4 is a rear view of the user wearing the facemask with an adjuster for a facemask according to the invention.

Referring to FIG. 3 and FIG. 4, the explanatory example of the adjuster of the present invention is illustrated. Four corners of the facemask are attached to an end of a girding band 11 respectively. The respective girding band 11 at the upper two corners of the facemask is provided to correspond to an adjuster 2 and the respective girding band at the lower two corners are provided to correspond to another adjuster 2. The free end of the respective girding band 11 at the upper two corners of the facemask is inserted into the first adjuster 2 and passes through the fixing groove 22 via the bottom of the arrow end 231 of the anti-move-back elastic member 23 above the top surface 221 of main body 2 and held by the arrow end 231 in place against the wall surface of the fixing groove 22. Similarly, the free end of the respective girding band 11 at the lower corners of the facemask is held in place with the second adjuster 2. It can be sent in FIG. 4 that the two adjusters 2 are disposed at the rear side of the head to engage with the respective girding band 11. In addition, because the respective girding band 11 encloses the user's head instead of hanging to the ears, the facemask 1 is capable of contacting with the face area at the mouth and the nose tightly. Furthermore, the user can adjust the tightness of the respective girding band 11 with the anti-move-back elastic member 23 of the adjuster 2 till the proper tightness being reached. When the user feels that the girding bands 11 are too tight, the free ends of the girding bands 11 can be pulled upward to disengage the girding bands 11 from the anti-move-back elastic member 23 and the adjustment can be started over again till the suitable tightness being obtained.

Figure 5A:
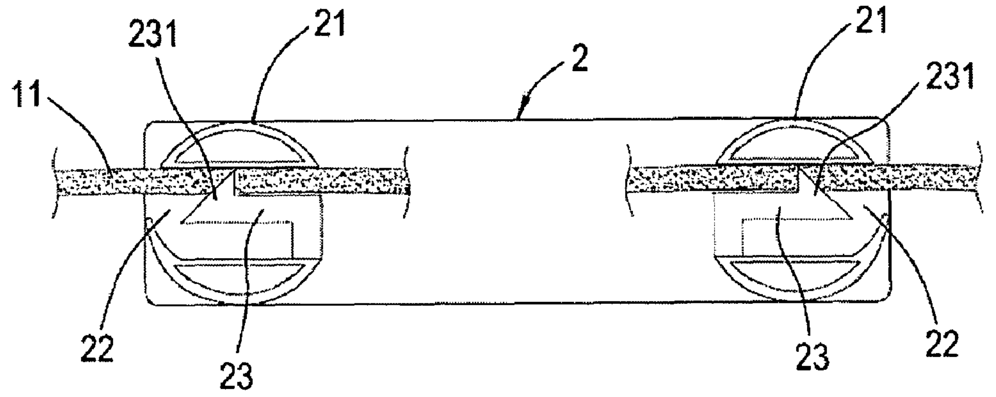
FIG. 5A and FIG. 5B are plan views of an adjuster for a facemask according to the invention while in use.
Figure 5B:
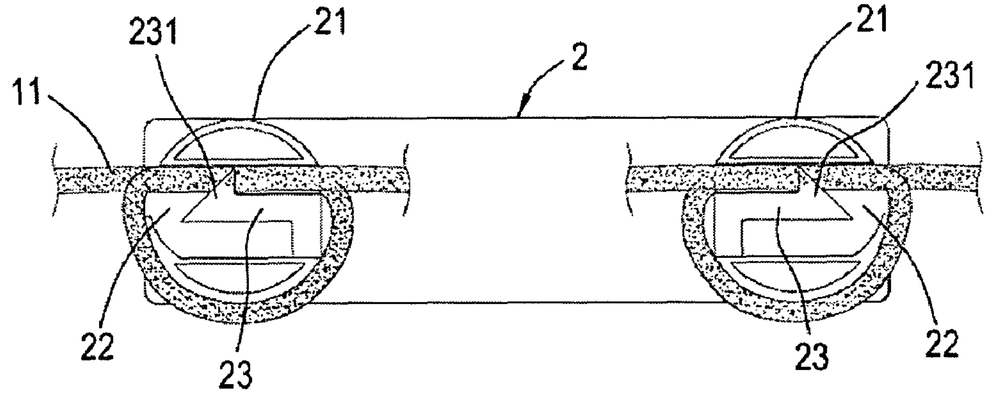
Figure 6:
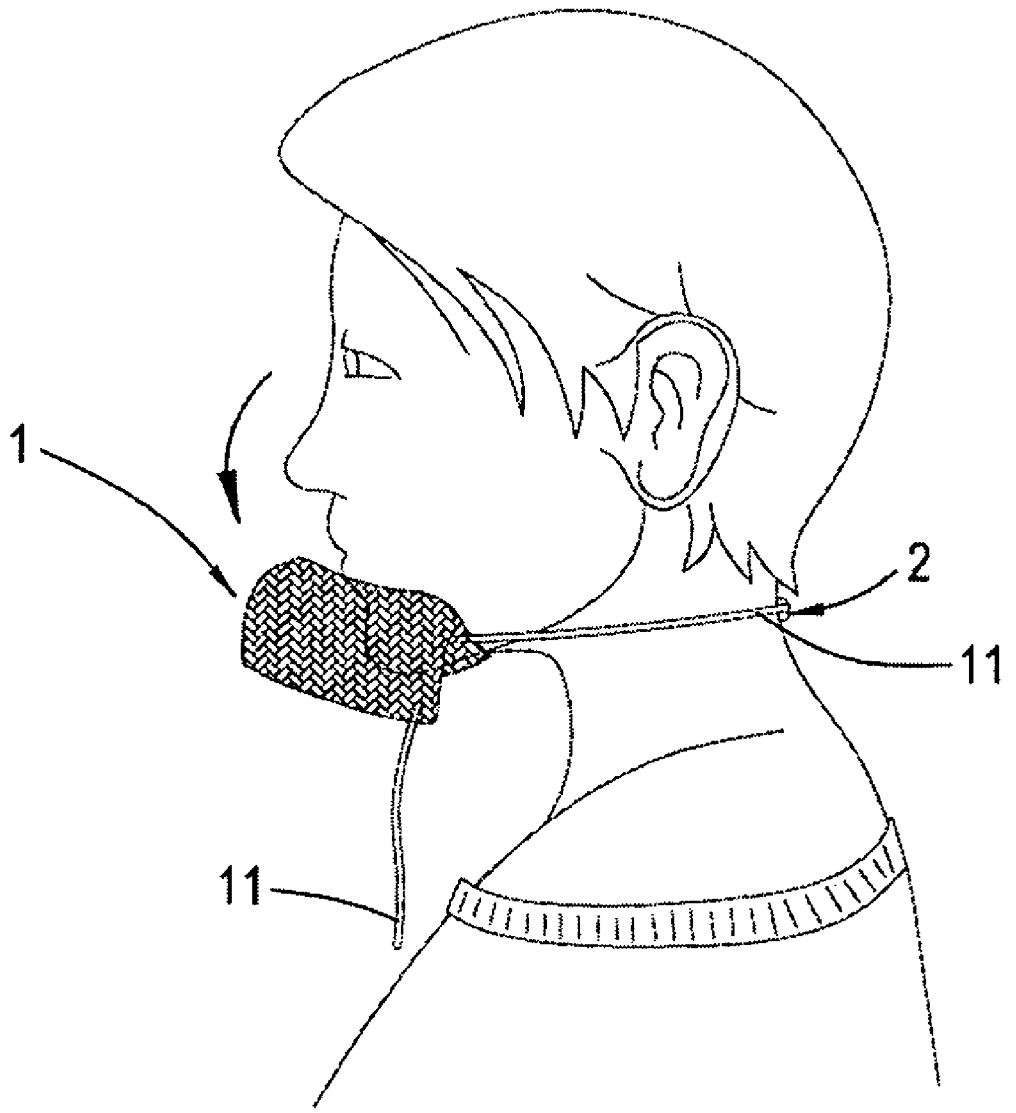
FIG. 6 is a side view of the user illustrating the facemask being partially detached from the adjuster of the invention.

FIG. 5A and FIG. 5B illustrate two ways for holding the girding bands 11 with the adjuster 2. As the foregoing, FIG. 5A shows the two opposite girding bands 11 are held with the pressing forces of the anti-move-back elastic member 23 respectively. FIG. 5B shows another way for holding the girding bands 11 and it can be seen that the girding bands 11 are wound around the peripheries of the fixing pillars 21 and then pass through the fixing grooves 22 again after the free ends of the girding bands 11 pass through the fixing grooves 22 via the anti-move-back elastic member 23. The second way shown in FIG. 5B can be performed with one of the fixing pillars 21 or both of the pillars 21 of the adjuster 2. The second way shown in FIG. 5B increases the tension of the respective girding band 11 and enhances stability of the facemask 1. Besides, in order to make sure if the girding bands 11 engage with adjuster 2 firmly, the free end of the respective girding band 11 can be arranged to pass through the fixing groove of the neighboring fixing pillar 21 additionally and then is wound around the periphery of the neighboring fixing pillar 2 (not shown). Moreover, the user can simply pull the free end of one of the girding bands 11 upward for loosening the facemask 1 and then turns the facemask 1 forward and downward from the nose and mouth such that the facemask can hang around the neck as shown in FIG. 6 for the user being able to take a breath or do any other necessary movements comfortably.

It is appreciated that the adjuster according to the present invention has the following advantages:

1. The adjuster of the present invention allows the user to adjust the tightness of the respective girding band preferably and easily. 2. The adjuster of the present invention offers the respective girding band a sufficient firmness after the girding bands pass through the fixing grooves and held with the anti-move-back elastic member.

Although specific embodiments have been illustrated and described, it is obvious to those skilled in the art that various modifications may be made without departing from what is intended to be limited solely by the appended claims.

The invention claimed is:

1. An adjuster for a face mask comprising:

a plate-shaped main body with a top surface; and two fixing pillars being disposed on a facial side of said main body in a way of being opposite to each other;

wherein each of said fixing pillars further comprises:

a fixing groove with a first wall surface and a second wall surface; and an L-shaped anti-move-back elastic member with a short side thereof extending to said first wall surface and a long side thereof being parallel to said two wall surfaces and having an arrow-shaped end to point outward and be disposed next to said second wall surface such that an end of a girding band is capable of inserting into said fixing groove via a bottom of said arrow-shaped end above said top surface adjustably without loosening due to being pressed by said anti-move-back elastic member.

* * * * *